(12) United States Patent
Welch (10) Patent No.: US 6,446,031 B1
(45) Date of Patent: Sep. 3, 2002

(54) CONE MAPPING PHYSICAL OPTICS FOR DESIGN OF INDOOR COMMUNICATION SYSTEM

(75) Inventor: John T. Welch, Akron, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/235,865

(22) Filed: Jan. 22, 1999

(51) Int. Cl.[7] .......................... G06F 17/10; G06F 17/50
(52) U.S. Cl. .............................. 703/2; 703/1; 455/3.01; 340/854.6
(58) Field of Search ........................ 703/1, 2; 345/429; 342/359, 350; 343/703; 455/3.01, 277.1, 67.6; 379/59; 340/854.6

(56) References Cited

U.S. PATENT DOCUMENTS

| 405,354 | A | 6/1889 | Hawk |
| 3,617,896 | A | 11/1971 | McCurain et al. ........... 325/363 |
| 4,012,850 | A | 3/1977 | Keith ............................ 35/10 |
| 5,370,538 | A | 12/1994 | Sidray ........................ 434/211 |
| 5,404,098 | A | 4/1995 | Osburn ........................ 324/95 |
| 5,423,683 | A | 6/1995 | Hurst et al. ................. 434/218 |
| 5,491,644 | A | 2/1996 | Pickering et al. ........... 364/514 |
| 5,574,466 | A | 11/1996 | Reed et al. ................. 342/359 |
| 5,583,780 | A | 12/1996 | Kee et al. ............... 364/468.24 |

OTHER PUBLICATIONS

Fruhwirth et al., T. Placing Base Stations in Wireless Indoor Communication Networks, IEEE Intelligent Systems, vol. 15, Issue 1, Jan./Feb. 2000, pp. 49–53.*

Ilow et al., J. Performance of FH SS Radio Networks in Interference Modeled as of Gaussian and Alpha–Stable Noise, IEEE Transactions on Communications, vol. 46, No. 4, Apr. 1998, pp. 509–520.*

Yu et al., Traffic Capacity Studies of TDMA In–Building Wireless Systems, 2nd International Conference on Universal Personal Communications, 1993, pp. 696–700.*

Seidel et al., Scott 914 MHz Path Loss Prediction Models for Indoor Wireless Communications in Multifloored Buildings, IEEE Transactions on Antennas and Propagation, vol. 40, No. 2, Feb. 1992, pp. 207–217.*

Honcharenko et al., W. Theoretical Prediction of UHF Propagation Within Office Buildings, 1st International Conference on Universal Personal Communications, 1992, ICUPC '92 Proceedings, pp. 04.04/1–04.04/4.*

* cited by examiner

Primary Examiner—Russell Frejd
(74) Attorney, Agent, or Firm—Renner, Kenner, Greive, Bobak, Taylor & Weber (57) ABSTRACT

A system of physical optics is provided which is employed in the design of indoor wireless communication systems, where transmitters are placed and oriented within a model of a building complex. The system provides for forward tracing of rays, which makes practical signal coverage displays that respond interactively to communication system design changes. The physical optics system consists of a method of generating semi-rectangular cone elements covering space, and a method of enumerating receiver test points within each cone for accumulation and display of electromagnetic signal coverage.

12 Claims, 7 Drawing Sheets

| theta | cones | theta | cones | theta | cones | theta | cones |
|---|---|---|---|---|---|---|---|
| 1.91 | 63 | 4.73 | 173 | 9.41 | 153 | 26.82 | 74 |
| 2.10 | 72 | 4.90 | 175 | 9.79 | 150 | 28.85 | 68 |
| 2.30 | 79 | 5.08 | 177 | 10.20 | 146 | 31.10 | 62 |
| 2.48 | 91 | 5.25 | 180 | 10.64 | 142 | 33.86 | 56 |
| 2.65 | 114 | 5.43 | 184 | 11.10 | 139 | 36.97 | 50 |
| 2.79 | 129 | 5.62 | 188 | 11.60 | 135 | 40.60 | 44 |
| 2.92 | 154 | 5.80 | 194 | 12.14 | 131 | 44.86 | 38 |
| 3.04 | 156 | 5.98 | 200 | 12.71 | 127 | 49.85 | 32 |
| 3.16 | 159 | 6.17 | 197 | 13.33 | 123 | 55.71 | 26 |
| 3.28 | 161 | 6.37 | 193 | 14.00 | 119 | 62.52 | 20 |
| 3.41 | 165 | 6.58 | 190 | 14.72 | 115 | 70.33 | 14 |
| 3.54 | 170 | 6.80 | 186 | 15.51 | 112 | 79.04 | 8 |
| 3.67 | 169 | 7.03 | 183 | 16.35 | 108 | | |
| 3.80 | 169 | 7.27 | 179 | 17.28 | 104 | | |
| 3.81 | 169 | 7.53 | 175 | 18.29 | 100 | | |
| 3.95 | 169 | 7.80 | 172 | 19.39 | 95 | | |
| 4.09 | 170 | 8.08 | 168 | 20.60 | 91 | | |
| 4.25 | 171 | 8.38 | 164 | 21.93 | 87 | | |
| 4.40 | 172 | 8.71 | 161 | 23.40 | 83 | | |
| 4.56 | 172 | 9.04 | 157 | 25.02 | 79 | | |

$k := \text{Floor}(x_3 / h);$
for $i := \text{Floor}(x_4 / h) + 1$ to $k$ do
begin
  $x_t := i \cdot h;$
  for $j := \text{Floor}((y_s + \sqrt{(\rho - v)^2 - (x_t - x_s)^2}) / h) + 1$ to
    $\text{Floor}((y_4 + (x_t - x_4) \cdot (y_4 - y_1) / (x_4 - x_1)) / h)$ do
    accumulate$(i,j);$
end;
$m := \text{Floor}(x_1 / h);$
for $i := k + 1$ to $m$ do
begin
  $x_t := i \cdot h;$
  for $j := \text{Floor}((y_3 + (x_t - x_3) \cdot (y_3 - y_2) / (x_3 - x_2)) / h) + 1$ to
    $\text{Floor}((y_4 + (x_t - x_4) \cdot (y_4 - y_1) / (x_4 - x_1)) / h)$ do
  accumulate$(i,j);$
end;
for $i := m + 1$ to $\text{Floor}(x_2 / h)$ do
begin
  $x_t := i \cdot h;$
  for $j := \text{Floor}((y_3 + (x_t - x_3) \cdot (y_3 - y_2) / (x_3 - x_2)) / h) + 1$ to
    $\text{Floor}((y_s + \sqrt{(\rho + u)^2 - (x_t - x_s)^2}) / h)$ do
    accumulate$(i,j);$
end;

```
if x₂ < x₃ then
    if x₁ < x₃ then
        if x₁ > x₄ then
            Do Case 1;
        else
            Do Case 2;
    else if y₁ > y₄ then
        if y₂ > y₃ then
            Do Case 3;
        else
            Do Case 4;
    else if x₂ > x₄ then
        Do Case 5;
    else
        Do Case 6;
else if x₁ > x₃ then
    if x₁ > x₄ then
        Do Case 7;
    else
        Do Case 8;
else if y₁ < y₄ then
    if y₂ < y₃ then
        Do Case 9;
    else
        Do Case 10;
else if x₂ < x₄ then
    Do Case 11;
else
    Do Case 12;
```

$x_v = x_s + \rho - v;$ $x_u = x_s + \rho + u;$ $k := \text{Floor}(x_v / h);$ $m_{34} = \text{Minimum}(x_3, x_4);$ $m_{12} = \text{Minimum}(x_1, x_2);$ for $i := \text{Floor}(m_{34} / h) + 1$ to $k$ do
begin
   $x_t := i \cdot h;$
   for $j := \text{Floor}((y_3 + (x_t - x_3) \cdot (y_3 - y_2) / (x_3 - x_2)) / h) + 1$ to
      $\text{Floor}((y_4 + (x_t - x_4) \cdot (y_4 - y_1) / (x_4 - x_1)) / h)$ do
      if $x_t^2 + (j \cdot h)^2 > (\rho - v)^2$ then
         accumulate($i,j$);
end;

$m := \text{Floor}(m_{12} / h);$ for $i := k + 1$ to $m$ do
begin
   $x_t := i \cdot h;$
   for $j := \text{Floor}((y_3 + (x_t - x_3) \cdot (y_3 - y_2) / (x_3 - x_2)) / h) + 1$ to
      $\text{Floor}((y_4 + (x_t - x_4) \cdot (y_4 - y_1) / (x_4 - x_1)) / h)$ do
   accumulate($i,j$);
end;

for $i := m + 1$ to $\text{Floor}(x_u / h)$ do
begin
   $x_t := i \cdot h;$
   for $j := \text{Floor}((y_3 + (x_t - x_3) \cdot (y_3 - y_2) / (x_3 - x_2)) / h) + 1$ to
      $\text{Floor}((y_4 + (x_t - x_4) \cdot (y_4 - y_1) / (x_4 - x_1)) / h)$ do
      if $x_t^2 + (j \cdot h)^2 \leq (\rho + u)^2$ then
         accumulate($i,j$);
end;

Fig. 9B

| Case | | left section | | | middle section | | | right section | | |
|---|---|---|---|---|---|---|---|---|---|---|
| | | lower | upper | | lower | upper | | lower | upper | |
| 1 | $x_1$ | left | top | $x_4$ | bottom | top | $x_3$ | right | top | $x_2$ |
| 2 | $x_4$ | bottom | left | $x_1$ | bottom | top | $x_3$ | right | top | $x_2$ |
| 3 | $x_4$ | bottom | left | $x_3$ | right | left | $x_1$ | right | top | $x_2$ |
| 4 | $m_{34}$ | right | left | $x_v$ | right | left | $m_{12}$ | right | left | $x_u$ |
| 5 | $x_3$ | right | bottom | $x_4$ | right | left | $x_2$ | top | left | $x_1$ |
| 6 | $x_3$ | right | bottom | $x_2$ | top | bottom | $x_4$ | top | left | $x_1$ |
| 7 | $x_2$ | top | right | $x_3$ | top | bottom | $x_4$ | top | left | $x_1$ |
| 8 | $x_2$ | top | right | $x_3$ | top | bottom | $x_1$ | left | bottom | $x_4$ |
| 9 | $x_2$ | top | right | $x_1$ | left | right | $x_3$ | left | bottom | $x_4$ |
| 10 | $x_u$ | left | right | $M_{12}$ | left | right | $x_v$ | left | right | $M_{34}$ |
| 11 | $x_1$ | left | top | $x_2$ | left | right | $x_4$ | bottom | right | $x_3$ |
| 12 | $x_1$ | left | top | $x_4$ | bottom | top | $x_2$ | bottom | right | $x_3$ |

Fig. 10

```
for i := Floor((x_s − r) / h ) + 1 to Floor(x_s + r) / h   do
begin
    x_t := i · h;
    y_t = √(r² − (x_t − x_s)²)
    for j := Floor((y_s − y_t) / h ) + 1 to Floor((y_s + y_t) / h ) do
        accumulate(i,j);
end;
```

Fig. 11

CONE MAPPING PHYSICAL OPTICS FOR DESIGN OF INDOOR COMMUNICATION SYSTEM

TECHNICAL FIELD

The present invention relates to efficient calculation and informative display of electromagnetic wave effects in the design of communication systems. More particularly, the present invention supports a modeling technique which facilitates the design of wireless communication systems within buildings, wherein electromagnetic wave "cones" emanating from point sources cover all space without overlap, and electromagnetic effects such as signal coverage are accumulated for display on horizontal planes.

BACKGROUND ART

Presently, indoor wireless communication systems employ radio frequency (RF) antennas located throughout a building complex so that adequate coverage is maintained. When designing such a system for a building complex, the designer must consider signal reflection from and transmission through building structures. Electromagnetic properties of building materials related to reflection and transmission can be measured under controlled conditions and tabulated for the use of designers. Moreover, buildings can be represented as collections of rectangular boxes, with electromagnetic transmission and reflection properties represented by parameter values assigned to box sides. To apply such models to the design of communication systems, computer software is required which can comprehensively display coverage resulting from a given design. Lacking such a tool, it will be appreciated that designers err on the side of including too many antennas operating at excessively high power levels, increasing both the purchase costs and operation costs of communication systems. Even so, there is no practical way to ensure that all necessary signal coverage within a building complex has been attained.

It is known to employ ray tracing, a form of physical optics, in evaluating wireless communication systems as disclosed in U.S. Pat. Nos. 5,491,644 and 5,574,466. The design systems of these disclosures employ ray tracing as part of a validation of wireless communication transfer characteristics. Unfortunately, these systems do not support interactive design of communication systems through comprehensive displays of coverage, because they are limited in the number of receiver test points for which signal coverage can be calculated. A coverage display of sufficient resolution for interactive system design requires thousands of receiver points.

The present limitation on numbers of receiver points is inherent in the method of physical optics employed by systems of the prior art. As taught in the above disclosures, the ray tracing technique employed in these systems works backwards from a receiver point to identify sources and associated signal paths. The calculations must account for rays coming into the receiver point from all possible directions. To do this task for large numbers of receiver points is impractical.

In a communication system design, there are few source points, compared to the number of receiver points desired for display purposes. It is therefore practical to consider rays in all directions emanating from source points. Each ray is considered once, along with each of its subsidiary rays generated by reflections from building walls. Rays are processed in a forward direction from source to receiver. As transmissions and reflections occur, a tree of ray segments is generated, still relatively few in number compared to the number of receiver points. As a ray and its generated ray segments are processed, its effects on each of the receiver points of the coverage display can be accumulated.

An important feature of an interactive design environment is to respond in a timely fashion to small changes in the design. In the backward solving physical optics systems of the present art, all ray processing must be repeated in response to a change of position of any transmitter. In a forward solving system, only the changed transmitter's signal coverage need be computed. To support this feature, it is only necessary to accumulate electromagnetic effects at the receivers separately for each transmitter, combining these effects for each display.

By reliance on backwards construction of ray paths, the present art cannot take into account the relative strength of each transmitter for efficient generation of ray segments in a building complex. Paths must continue until they exhaust the possibility of reaching the strongest transmitter.

The present art does not extend to the forward solving physical optics described above, for lack of solution to certain technical problems which are the subject of the present invention. Specifically, the present art does not teach how to approximate efficiently a spherical signal wave front by a discrete set of approximately equal cones, each representing the local effects of the wave in the neighborhood of a ray. Nor is it taught how to propagate the boundaries of such cones accurately so that discrete contributions of a source to a display point are not missed, nor covered more than once. It has therefore not been taught how to model antenna transmission characteristics within such a system, so as to compute the effects of orientation of transmitters. The present art does not teach how to determine efficiently and accurately which display points are significantly affected by a ray.

These elements, along with provisions for handling reflected as well as transmitted wave propagation within a building, together constitute a system of physical optics which is the subject of the present invention. This system, referred to in this description as the cone mapping method, permits the scientific and empirical knowledge of electromagnetic wave propagation evidenced in the current art to be applied in a timely manner to the computation of displays of signal coverage of a communication system in a building complex.

DISCLOSURE OF INVENTION

Therefore, an object of the present invention is to provide efficient computational techniques enabling signal coverage displays for the interactive design of communication systems within buildings, such design determining adequate placement, orientation and power level of transmitters of a wireless communication system.

Another object of the present invention, as set forth above, is to project signal coverage throughout areas of interest in a building complex, to a resolution required for displays ensuring adequate coverage.

A further object of the present invention, as set forth above, is to represent signal transmission from directionally oriented transmitters to large numbers of receiver test points in a discrete model, without introducing erroneous artifacts of the discrete model through computational inaccuracies.

Still another object of the present invention, as set forth in brief above, is to model each transmitter as a discrete set of rays corresponding to an antenna pattern registered with the modeling program.

Yet another object of the present invention, as set forth above, is to limit the generation of ray segments to those with sufficient strength to affect test receivers significantly.

A further object of the present invention, as set forth above, is to respond interactively to small changes in the design of the communication system being modeled, by computing and maintaining signal coverage values separately for transmitters of the design.

The foregoing and other aspects of the invention, which shall become apparent as the detailed description proceeds, are achieved by a modeling method for determining the signal coverage provided by a wireless communication system of at least one point source such as a transmitter and at least one receiver in a modeled building, comprising the steps of covering completely and without overlap, the space around a point source by a plurality of cones of appropriate size and shape, assigning relative signal strength to each of the plurality of cones based on the angular orientation of a transmitter at the point source and a spherical antenna pattern associated with the transmitter, processing in a forward direction from the point source to the receiver a center ray segment of each plurality of cones corresponding to transmitted and reflected portions of the center ray segments in uninterrupted travel between modeled building surfaces, providing receiver test points arranged in regularly spaced, rectangular, planar test point grids, computing the intersection of the cones with the receiver test point grids, and enumerating the receiver test points within the cone intersections for the accumulation of electromagnetic effect of the ray segment on the receiver test point.

Yet another aspect of the present invention is attained by a computer-readable medium for determining signal coverage of a wireless communication system within a building, comprising means for storing a model of the building features including at least walls, floors and openings, the storing means also storing transmissive and reflective properties associated with the building features, means for assigning at least one transmitter and at least one receiver to positions on the model, means for covering the space around at least one transmitter with a plurality of cones of approximately equal size, means for associating an antenna pattern with at least one transmitter and assigning a center ray segment with a relative signal strength of the antenna pattern to each of the plurality of cones, means for associating a receiver grid pattern with at least one receiver, means for processing the center ray segment generated by the transmitter through each of the plurality of cones toward the receiver including a determination of transmission and/or reflection of the center ray segment upon impinging the building features, the processing means tracking the center ray segment until strength thereof is deemed negligible, and means for computing an intersection of the plurality of cones with the receiver grid pattern to determine if the relative signal strength is adequate to reach at least one receiver.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

In this description of the present invention, each of the technical problems resolved by the present invention is discussed in turn, for the sake of a clear teaching of the invention. It can be appreciated, however, that features of the invention address more than one technical problem and that such an exposition becomes possible only after the invention is fully conceptualized.

The present invention applies to the design of indoor wireless communication systems, where transmitters are placed and oriented within a model of a building complex. In the type of design program supported by the present invention, the building model can be three dimensional, with rooms represented by rectangular boxes. Properties of the walls, floors and ceilings of the rooms affecting the transmission and reflection of electromagnetic waves are summarized as transmission and reflection coefficient values. Typically such values are tabulated for commonly encountered construction materials, and are thereby assigned to the box faces in the modeling process by identifying the type of material there. Provision is normally made for rectangular sections of different transmission and reflection coefficients, corresponding to openings such as doors, windows, and skylights.

Transmitters are modeled in the design system as spherical patterns of relative signal strength, often referred to as antenna patterns. The orientation of each transmitter is specified, along with the placement location and relative transmitting signal strength, in the communication system design. The decrease in signal strength as a function of distance along a transmitting ray is known, and the decrease in strength as the ray passes through a box (room) face into another box, or reflects back into the same box, is specified by transmission or reflection coefficients assigned by the system designer.

The present invention is a system of physical optics whereby space around each transmitter of a wireless communication system is divided into rectangular cones. Signal coverage is computed at test receiver points arranged in horizontal rectangular grids covering the areas of coverage interest within the building complex. The communications designer specifies a set of coverage grids, and the program maintains sets of coverage data corresponding to the grids, one for each transmitter. When the physical optics calculations are completed, the designer can view a color coded display of receiver points against a background cross section of the building at the level of the grid. The colors reflect signal coverage levels, indicating under covered and over covered areas. The system is ideally embodied in a computer-readable medium capable of execution on commercially available or special-use computers. The system is interactive with a user inasmuch as the user can define the parameters of the modeled building such as reflection and transmission characteristics, transmitter and receiver placement and any other variable related to the design of an indoor wireless communication system.

Figure 1:
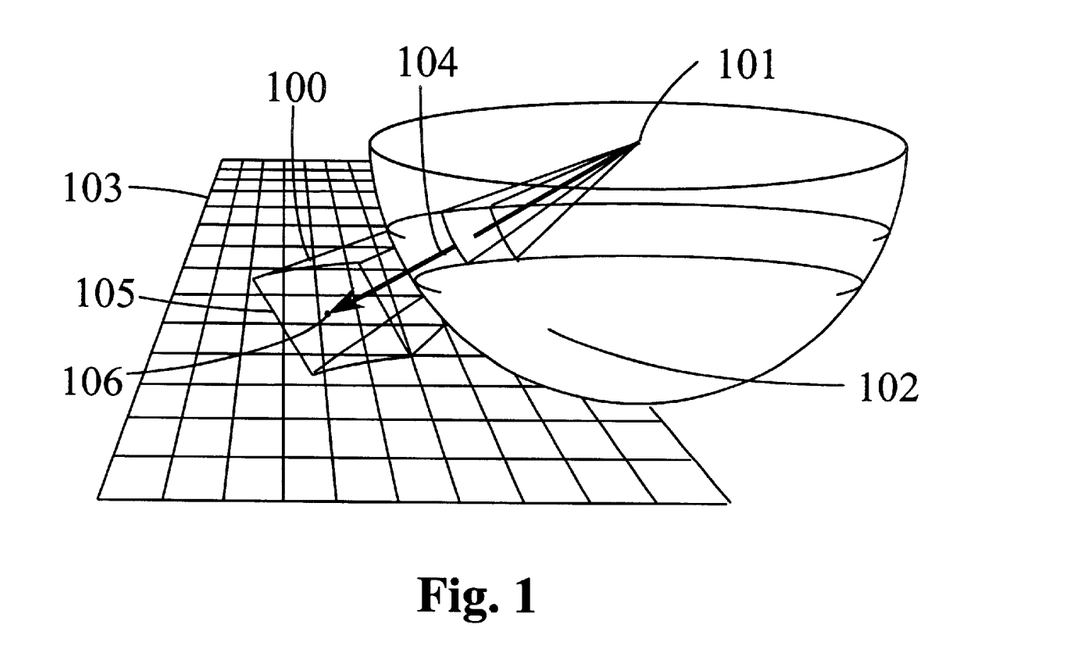
FIG. 1 is a schematic representation of a ray cone projected from a signal source to a test receiver grid.

The intersection of one cone and one receiver grid is illustrated in FIG. 1. A cone 100 is viewed from behind a point 101 in space representing a transmitter, looking past a forward surface of a sphere 102 centered on the point, towards a receiver grid 103. Each cone 100 is centered about a line segment, in physical optics known as a ray 104. The cone 100, which will be specified in detail in the following description, is approximately rectangular. The intersection of a ray cone 100 and the plane of the receiver grid 103 forms an approximately trapezoidal area or footprint 105 on the grid plane. The area of intersection will be termed in this description the footprint of the cone 100 on the grid 103. Receiver points are depicted in the figure as grid intersections. The present invention provides for efficient and accurate identification of the receiver points enclosed within this footprint. Each of these points receives the signal contribution of the ray, as computed where the ray 104 crosses the receiver grid 103 at a point 106.

Generation of Cones

Generated cones covering the space around a transmitter point must be of approximately equal width and should vary in height in proportion to the angle of a transmitted ray with the horizontal. This follows from the fact that required resolution of discrete modeling in a communications design system is the same in all directions, and that footprints at similar distances from transmitter points should have similar dimensions. Additionally, cones which represent the local effects of a wave about its center ray must not be elongated in one direction as opposed to another. The problem is equivalent to defining a set of regular patches of similar area that exactly cover a sphere. Having found such a covering, the cone corresponding to each patch is defined by lines projecting from the center of the sphere through the boundaries of a patch. It is also necessary that footprints of cones on receiver grids be mathematically defined so as to allow efficient determination of receiver points within a footprint.

The problem of generating covering cones with easily computable footprints is resolved in the present invention by using a spherical grid aligned with the coordinate system of the building. This spherical grid must be separated in function from a grid representing the antenna pattern which is oriented with the transmitter. Within this description the grid defining cones will be referred to as the cone grid, to distinguish it from the antenna pattern grid.

The cone grid of the present invention is adapted from the polar grid defining latitude and longitude lines in cartographic practice. In this cartographic grid, longitudes are great circles, the intersections of the sphere with vertical planes intersecting at the vertical center line and equally distributed by angle in the horizontal plane. Latitudes are intersections of the sphere with equally spaced horizontal planes. With vertical alignment of the North and South poles of a cartographic grid, the corresponding cones defined by longitudes would be trapezoidal in shape, with straight lines as side boundaries, and circular boundaries at the top and bottom. The cartographic grid is unsuitable to the purposes of communication system modeling without adaptation, in that "square" patches bounded by equally spaced longitudes and latitudes in each direction get smaller and narrower as one approaches the poles of the grid, where longitudes get closer and closer together.

Figure 2:
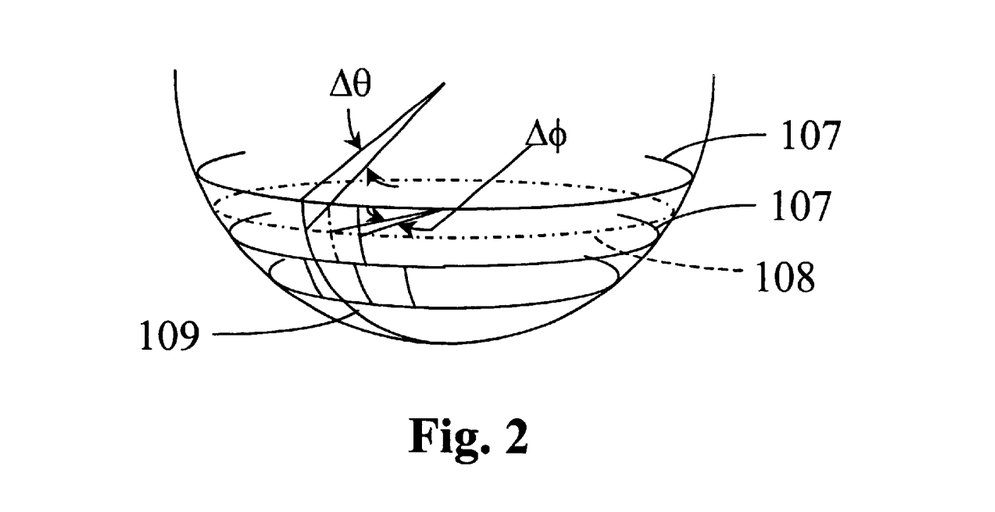
FIG. 2 is a schematic representation of elements defining a cone grid.

In the cone grid of the present invention, latitudes are not equally spaced, but are progressively narrowed as the poles are approached. This is illustrated in FIG. 2, which shows two latitude bands and three corresponding patches. The size of the bands and patches are greatly exaggerated in the figure, relative to the size of the sphere of the cone grid. Bands and patches are bounded above and below by latitudes 107. A middle latitude 108 is defined in each band as the latitude equidistant from each bounding latitude. Bands are specified by a mid-band latitude angle $\theta$ measured from the equatorial plane of the sphere to the middle latitude of the band. The $\Delta\theta$ of the figure is the angle subtended by an upper or lower half band. The vertical sides of patches are sections of longitudes 109. Within each band, the perimeter of the middle latitude is divided into an appropriate number of equal sections, so as to maintain approximately equal patch widths over the sphere. The width of patches within each band is specified by the angle $\Delta\phi$ subtended by the midpoint and one edge of a patch. The band is covered by patches, but the patches do not align with each other from band to band, as FIG. 2 illustrates. With the poles of the cone grid vertically aligned, the boundaries of footprints on receiver grids are projections of latitudes and longitudes. As in the cartographic grid, latitudes project onto horizontal planes as circles, and longitudes as straight lines. All footprints 105 are trapezoidal in shape, with the top and bottom edges being circular arcs and the sides being straight lines. The determination of receiver points within such a footprint is described below.

Figure 3:
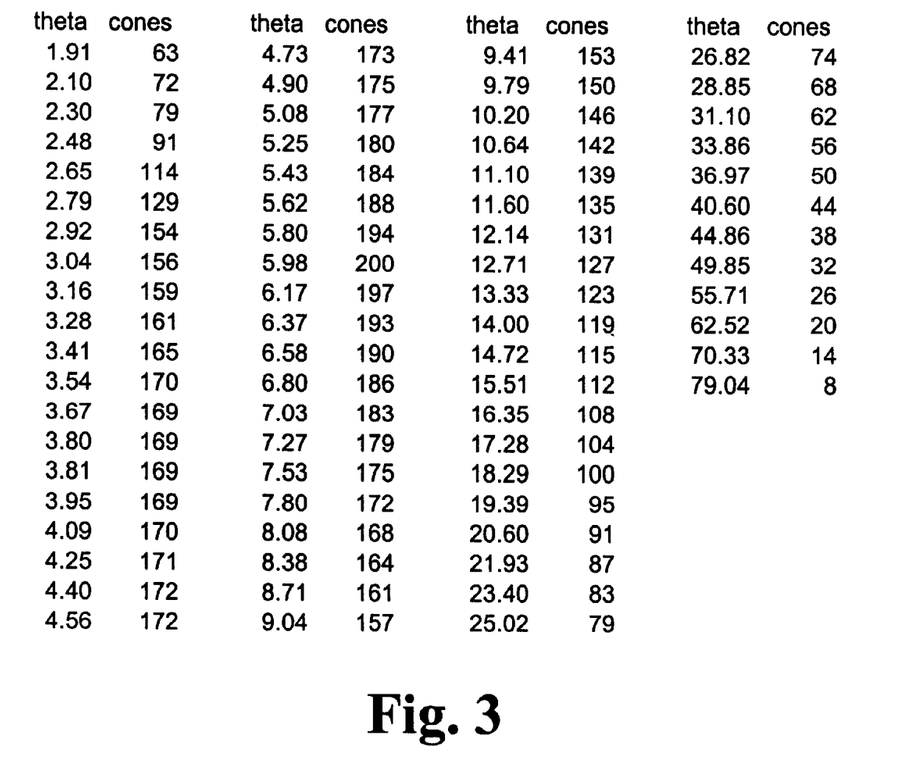
FIG. 3 is a table of latitudes and numbers of cones for bands of a typical cone grid design.

A cone grid is specified by a set of mid-band latitude angles $\theta$ and the number of cones generated within each band. Normally the grid would be symmetric with respect to the equatorial plane of the cone grid sphere. In a cone grid designed for equally sized footprints, the height of bands is decreased as the equator is approached. In most applications of the present invention, a minimum distance can be assumed from a transmitter to the nearest receiver grid. Signal attenuation data can determine a maximum distance to project any ray. Thus a smallest mid-band angle $\theta$ can be set. Also, wider cones can be tolerated at mid-band angles near the minimum, because these cones can only contribute highly attenuated signals to any receiver point. Typical symmetric cone grids are shown in the table of FIG. 3, which specifies a design of 142 bands for either an upper or a lower half of the sphere 102. In this design, cones of about eight degrees in angular dimension at the minimum mid-band latitude angle of 1.91 degrees, decrease to less than one degree of angular dimension at a mid-band latitude of about six degrees. The cone width is then held below one degree with decreasing numbers of cones per band.

The cone grid of the present invention leaves a circular hole uncovered at each pole. In many applications, antenna patterns and permitted orientations of transmitters will allow these holes to be left uncovered. If not, the physical optics calculations are easily extended to generate vertical circular cones at the poles, completing the spherical coverage. These cones are processed like others, with the exception of the determination of affected receiver points on the receiver grids, a task described in detail below.

Implementing an Antenna Pattern

Rays generated by a cone grid of the present invention have a direction specified by an azimuth angle $\phi$ and a mid-latitude angle $\theta$. A recommended way to represent antenna patterns is by means of a cartographic grid of equally spaced longitudes and latitudes. It is also recommended that the orientation of transmitters be specified by the same means, with an azimuth angle and an angle in the vertical plane designated by that angle and measured from the horizontal. Following these recommendations, the ray direction is translated by a simple transformation to a longitude and latitude on the antenna pattern grid, from which a relative signal strength value can be interpolated by ordinary technique. In other words, the antenna pattern grid is employed to associate signal strength to rays associated with the cone grid.

Generating Ray Segments in a Building Model

In physical optics related to modeled buildings, a ray is split into a binary tree of ray segments as it passes through plane structures. Each encounter with a plane surface results in a transmitted ray segment and a reflected ray segment. This section describes the processing of ray segments in communication design software utilizing the present invention, which permits this processing to be done in a forward direction from a source point to a receiver.

Figure 4:
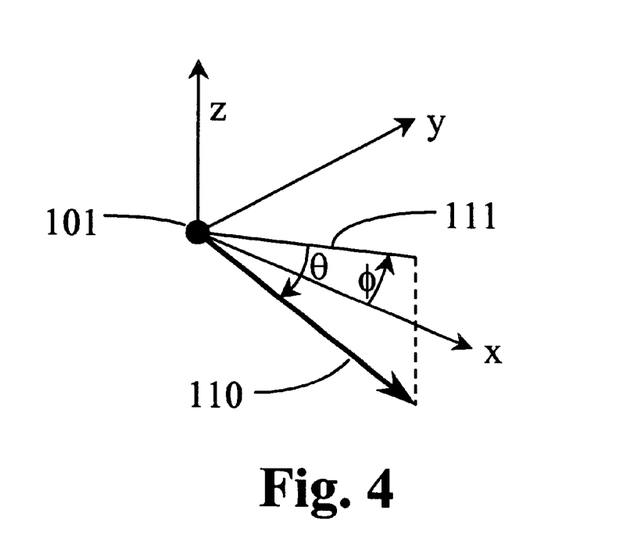
FIG. 4 illustrates the angles measuring the direction of a segment ray.

FIG. 4 depicts a ray 110 emerging from a source point 101 in a rectangular xyz coordinate system. The vertical plane containing the ray, and the projection 111 of the ray in the xy plane, make an azimuth angle $\phi$ with the x axis. In the vertical plane, the ray makes a mid-latitude angle $\theta$ with the xy plane. The direction cosines of the ray are $$c_x = \cos\theta \cdot \cos\phi \quad c_y = \cos\theta \cdot \sin\phi \quad c_z = \sin\theta$$

The direction cosines of rays of a cone grid are tabulated within the software. As it processes a ray segment, the software maintains a record of the ray segment's direction cosines ($c_x$, $c_y$, $c_z$), its origin point ($x_o$, $y_o$, $z_o$), and the distance of the origin point from the source point. Direction cosines determine readily the intersection of the ray with planes parallel with coordinate planes. For example, the coordinates of intersection with a receiver grid plane at elevation zg is at the point $$x_g = x_o + t \cdot c_x \quad y_g = Y_o + t \cdot c_y,$$

where $t = (z_g - z_o)/c_z$. The value t is the distance traveled by the segment to reach the grid. By tracking from the source point which room of the building model the origin of the current segment lies, and using calculations similar to the above, the physical optics software can determine the coordinates of and distance to the point at which the ray exits the room, thus defining a ray segment for receiver grid processing. The distance across the room is accumulated to form the distance to the origin point of the next segments along the ray. If the accumulated distance is larger than the maximum distance for significant signal strength, the generation of new ray segments is discontinued. Also, the current ray segment can be shortened to terminate at $$x_e = x_o + t_e \cdot c_x \quad e = y_o + t_e \cdot c_y \quad z_e = z_o + t_e \cdot c_z,$$

where $t_e$ is the allowed distance the ray is permitted to penetrate the room.

Using the known physical laws of transmission and reflection of waves by plane surfaces, a reflected segment can be started within the same room, and a transmitted segment can be started in an adjacent room. This is done, when attenuation of signal, as modeled by the reflection and transmission coefficients described earlier, indicates significant remaining signal strength after reflection or transmission. The direction cosines of the new segments are easily determined from known physical laws.

Programming technique for generating and processing segments one at a time, when each segment generates two more potential segments, is employed. A function is included in the software to handle all elements of processing a segment, including the generation of new segments. The function contains code to handle either the reflected or the transmitted segments in a loop. To process the other type of segment (reflected or transmitted), the function calls itself recursively, passing parameter values for the new segment to the called function. Values are passed for each of the parameters maintained for every segment, as described above.

Calculating a Receiver Grid Footprint

As each segment is defined by the process just described, its contribution to the accumulated signal of receiver points is computed and recorded. This is a multiple stage process designed to eliminate most receivers from consideration with little work. The first step is to compare the elevations (z coordinates of FIG. 2) with grid plane elevations. For receiver grids possibly intersecting the segment by this test, the intersection point is calculated and compared with the rectangular boundaries of the receiver grid. For a grid intersecting the segment by this test, a footprint is calculated.

In physical optics practice, the ray segment 110 is treated as if it came from a source without reflection or distortion of transmitted direction. If the accumulated distance along segments from the source to the receiver grid intersection is d, then the coordinates ($x_s$, $y_s$, $z_s$) of this projected source are given by $$x_s = x_g - d \cdot c_x \quad y_s = y_g - d \cdot c_y \quad z_s = z_g - d \cdot c_z$$

The distances from the source point to the projections of the top and bottom circles of the footprint are $$d' = (z_g - z_s)/\sin(\theta - \Delta\theta)$$

and $$d'' = (z_g - z_s)/\sin(\theta + \Delta\theta),$$

where $\Delta\theta$ is the vertical half angle of the cone shown in FIG. 2 and $\theta$ is the angle of the ray from the horizontal, shown in FIG. 4. The trigonometric factors $1.0/\sin(\theta \pm \Delta\theta)$ used to calculate d' and d'' are tabulated values derived from the grid cone design, and require only a table lookup and multiplication in the footprint calculation. The sign of the angle $\theta$ determines which is the large distance to the top of the trapezoidal footprint.

Determination of the receiver points within the footprint requires the coordinates of the four corners of the footprint.

A first step in calculating these coordinates is to determine the distances u and v in the receiver grid plane from the ray intersection point 106 of FIG. 1 to the top and bottom circular boundaries, respectively. These distances are pictured in FIG. 5 in the vertical plane containing the ray. The radial distance in the receiver grid plane from the projected source point 112 with coordinates $(x_s, Y_s, z_g)$ to the intersection point 106 is denoted by ρ, and is given by $$\rho = d \cdot \cos \theta$$

Figure 5:
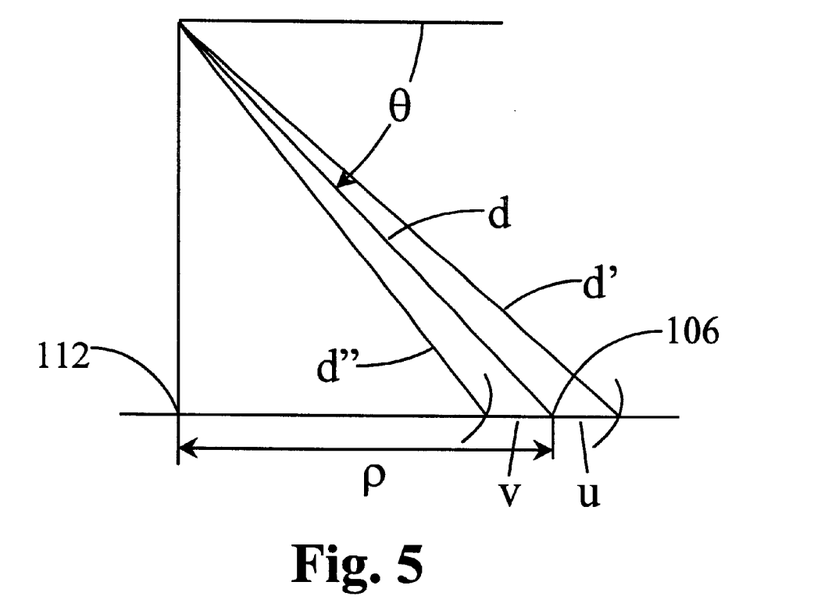
FIG. 5 illustrates the distances and angle locating the top and bottom of a footprint where a cone intersects the test receiver grid.

Supposing that d' is the longer distance, then the footprint dimensions u and v are given by the Law of Cosines as $$u = \sqrt{d^2 + d'^2 - 2dd'\cos\Delta\theta} \quad v = \sqrt{d^2 + d''^2 - 2dd''\cos\Delta\theta}$$

The trigonometric factor cos Δθ can be tabulated for bands of a cone grid design.

Even though the square root function is hardware aided in modern processors, the calculation of u and v can be speeded up by retaining values for each grid, and communicating to the footprint calculation software when the latitude band changes. As demonstrated in the table of FIG. 3 by the numbers of rays per band, when rays are generated band by band, the mid-band angle θ, and consequently the values of d, d', d" and ρ for a source point and grid change infrequently. By re-use of the u and v values of a grid, the calculations shown above are avoided, except when the band changes. These values must be tabulated for each grid, because multiple grids are encountered in processing a ray as described above. In such a speed up technique, rays reflected so as to change the mid-band angle are treated as special cases, requiring the computation of u and v but not allowing the storage of these values to replace the values computed for the current source point.

Figure 6:
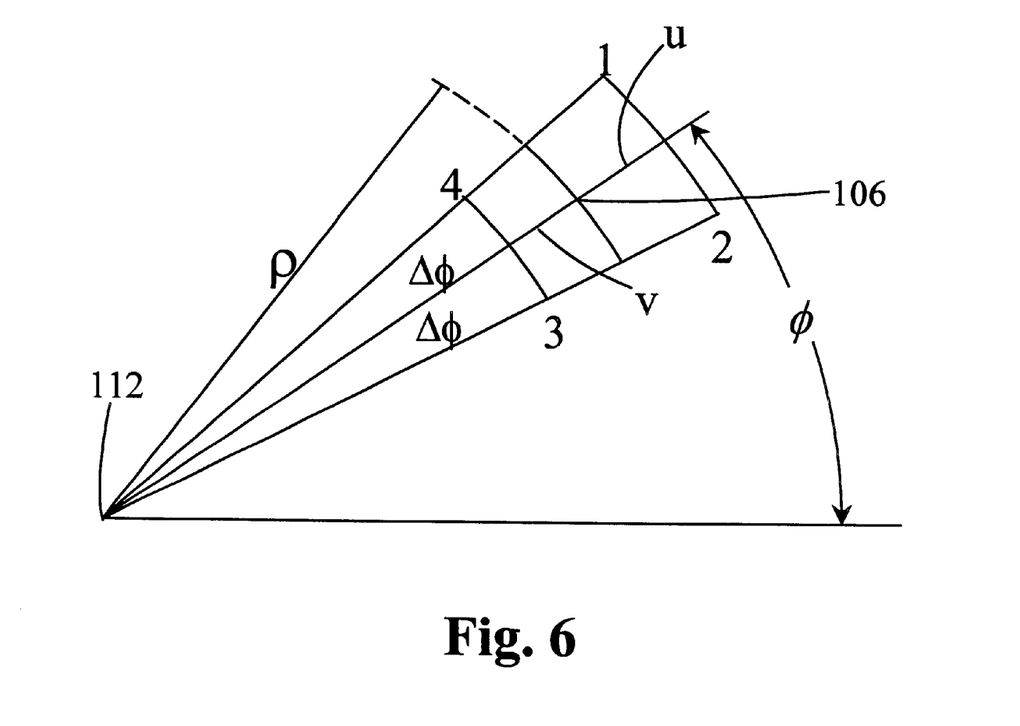
FIG. 6 illustrates the distances and angles locating the corners of the footprint.

The basis for calculation of footprint corner coordinates, given values of u and v, is illustrated in FIG. 6, which views the projected source point 112 and the footprint in the grid plane. The coordinates of the four corner points, as numbered in FIG. 6, are given by $$x_1 = x_s + (\rho + u)\cos(\phi + \Delta\phi) \quad y_1 = y_s + (\rho + u)\sin(\phi + \Delta\theta)$$
$$x_2 = x_s (\rho + u)\cos(\phi - \Delta\phi) \quad y_2 = y_s + (\rho + u)\sin(\phi - \Delta\phi)$$
$$x_3 = x_s + (\rho - v)\cos(\phi - \Delta\phi) \quad y_3 = y_s + (\rho - v)\sin(\phi - \Delta\phi)$$
$$x_4 = x_s + (\rho - v)\cos(\phi + \Delta\phi) \quad y_4 = y_s + (\rho - v)\sin(\phi + \Delta\phi).$$

Enumeration of Receiver Points

General methods of testing enclosure of a given point within a polygon are known and could be adapted for footprint boundaries of this invention. This approach is unsuitable, however, because of the large numbers of receiver points required for displays of signal coverage or other electromagnetic effects. Instead, an enumeration of receiver points contained in a footprint is performed in the present invention, based on the corner coordinates of the footprint.

Figure 7A:
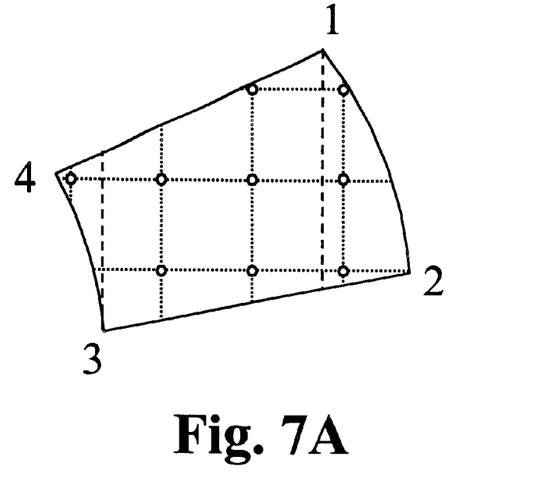
FIG. 7A illustrates the division of a footprint for enumerating the receiver points it contains.
Figure 7B:
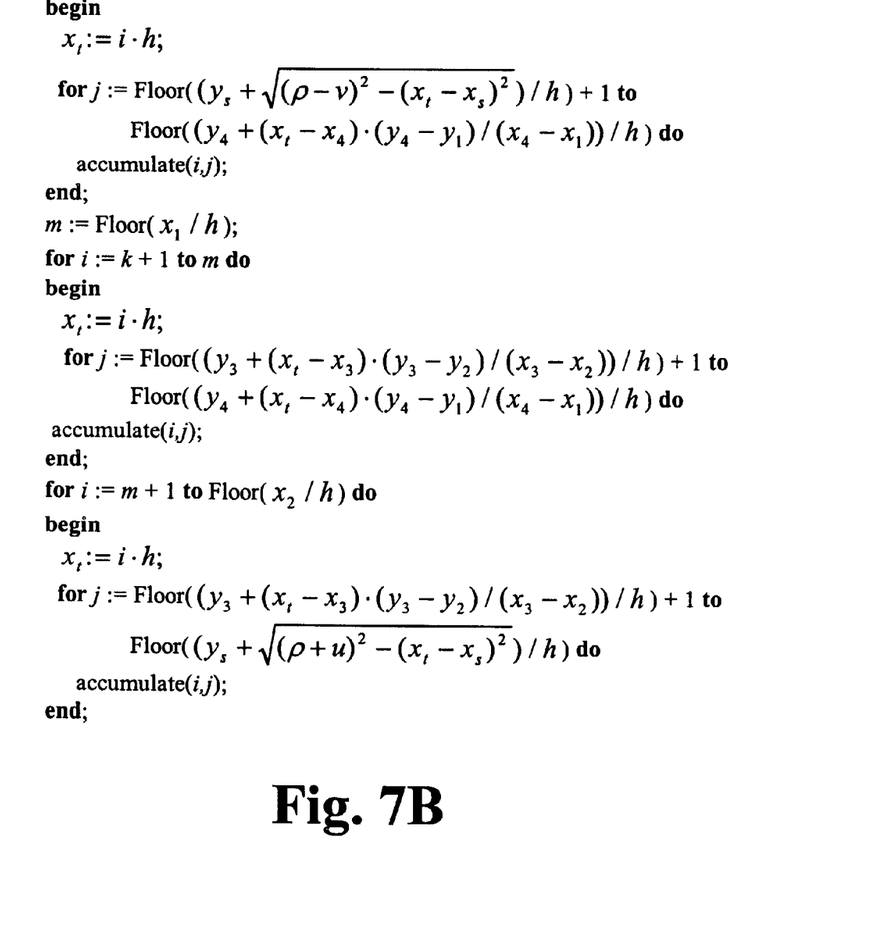
FIG. 7B shows the receiver point enumeration algorithm for one footprint case.

The enumeration method is illustrated in FIGS. 7A and 7B. FIG. 7A depicts a typical footprint and its enclosed receiver points. As in the other figures of this description, the curvature of the top and bottom of the trapezoidal footprint is exaggerated for purposes of illustration. As illustrated by the dashed lines, the footprint is divided into three sections by the $x_i$ coordinates of footprint corners 3 and 1. Within each section, a different pair of footprint boundaries enclose the receiver points above and below.

Receiver points within each section are enumerated as illustrated in FIG. 7B, by determining the receiver grid columns intersecting the footprint section, and for each column, the lowest and highest numbered receiver points within the footprint section. To make these determinations, floating point values representing intersections of receiver grid lines and footprint boundaries are truncated, using the mathematical floor function. The floor of a real number x is defined as the largest integer no greater than x, regardless of sign and is commonly denoted by $\lfloor x \rfloor$ The enumeration algorithm for the footprint of FIG. 7A is detailed in FIG. 7B, following Pascal conventions. The algorithm consists of three nested loops covering the three sections shown in FIG. 7A. The rightmost column intersecting the left section is determined, using the receiver grid spacing h, as $$\text{Floor}(x_3/h).$$

Then an outer loop is begun over the columns of the left section. There is one such column in the example footprint shown. For each column, the y coordinates of intersections of the vertical grid line with footprint boundaries are determined, and are truncated to determine lowest and highest receiver points within the footprint. In the left section, the lower boundary is the circular boundary at the bottom of the trapezoidal footprint. The expression $$(y_s + \sqrt{(\rho-v)^2 - (x_{t-x_s})^2})/h$$

is evaluated at the x coordinate of the column to obtain the lowest enclosed receiver point. The highest enclosed receiver point is obtained by evaluating an expression for the left boundary line of the footprint trapezoid. With the bounding receiver points determined, the inner loop calls the function accumulate to accumulate the electromagnetic effects calculated for the grid intersection point at each receiver point (i,j) on the column. This function accounts for the position of the grid to determine an index for matrix storage of the accumulating value associated with the receiver point.

The enumeration algorithm continues with nested loops covering the other two sections of the footprint. In the middle section, it generates points between linear side boundaries. In the right section, it generates points from the right linear boundary of the footprint to the circular top boundary. If any column or footprint section contains no receiver points, the corresponding loops are empty, and no accumulation occurs.

The enumeration algorithm of FIG. 7B applies only to footprint orientations in which $$x_4 \leq x_3 \leq x_1 \leq x_2.$$

The enumeration algorithm of the present invention distinguishes 12 different cases of x coordinate ordering which can result from the orientation of the footprint. In each case, footprint sections have different boundaries. These cases are identified in FIG. 8A, which includes a snapshot of the footprint and the projection of its ray at every critical position where the case changes. The conical areas containing numbers are the areas swept out by the ray projections of orientations of the corresponding case. Moving clockwise, for example, Case 1 is the set of orientations starting where the right linear boundary of the footprint is vertical, and ending where the left boundary is vertical. Case 2 extends from the latter point to the position where $x_i$ moves past $x_3$. Case 3, which is the case of FIGS. 7A and 7B, extends from there, to the position at which the right boundary of the footprint becomes horizontal. At most of the critical positions shown in FIG. 8A, only two sections exist, because section boundary coordinates are aligned. These orientations can be treated by either adjacent case of the enumeration algorithm.

Figure 8A:
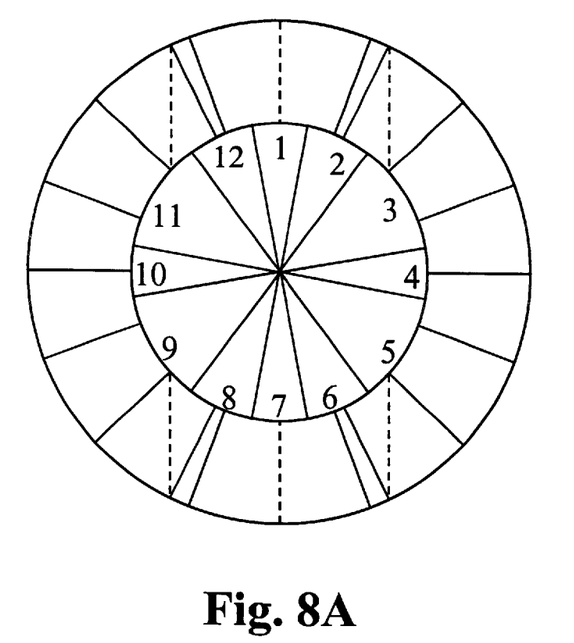
FIG. 8A illustrates the 12 cases of footprint orientation considered in receiver point enumeration.
Figure 8B:
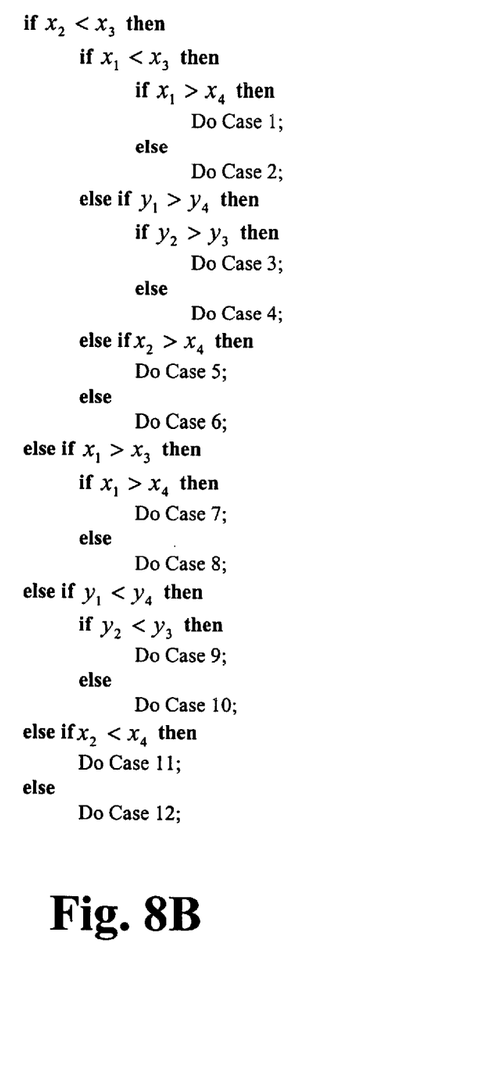
FIG. 8B shows an algorithm for the determination of the orientation case of a footprint.

The selection of an enumeration procedure, based on the orientation of the footprint, is illustrated in FIG. 8B, using Pascal conventions. Comparison of footprint corner coordinate values quickly determines the enumeration process to be performed. In this figure, "Do Case 3" represents the processing shown in FIG. 7B. Each case requires a separate coding because of differences in section boundaries.

Figures 9A, 9B:
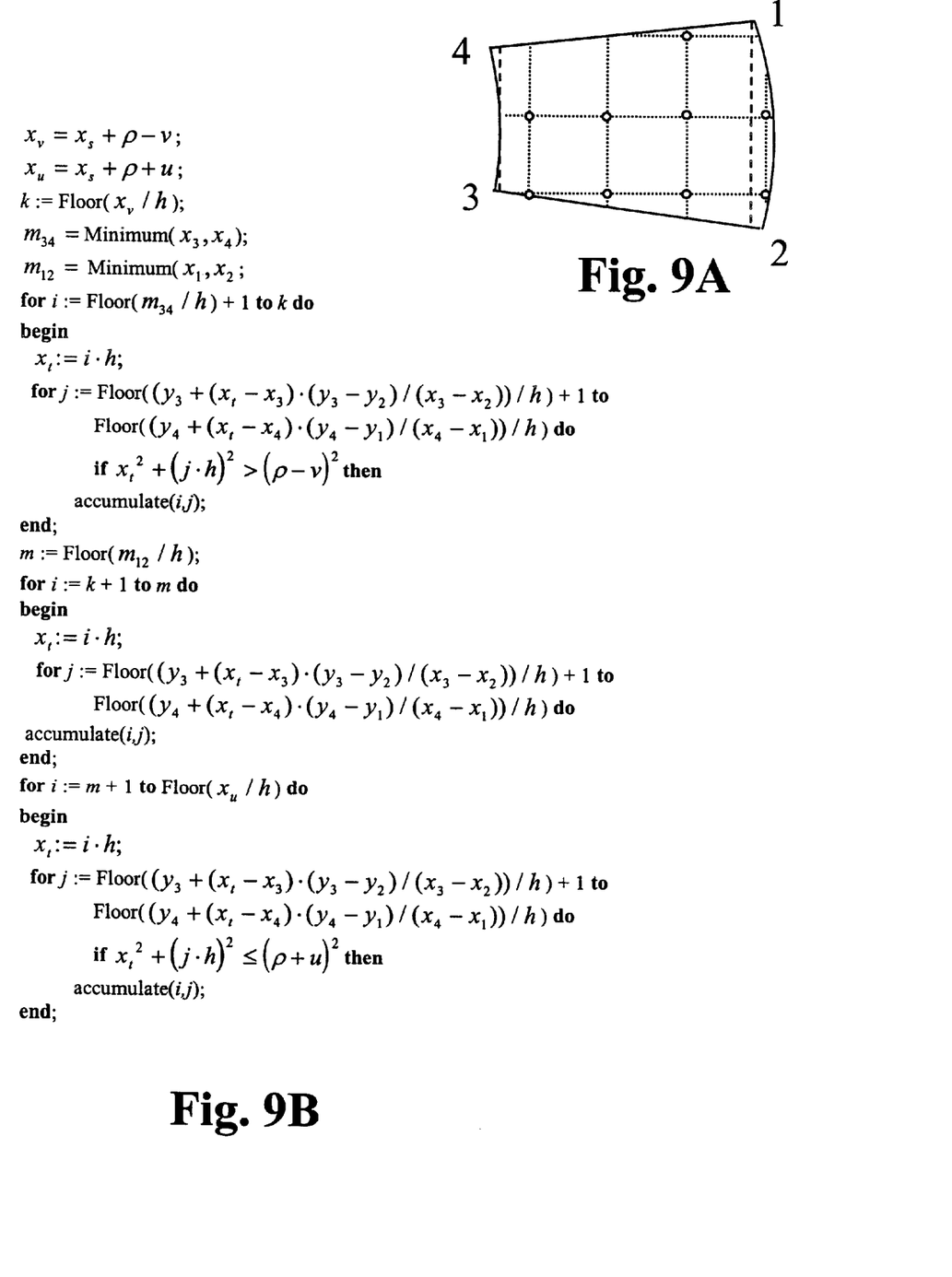
FIG. 9A illustrates one of two cases where the footprint has more than three sections.
FIG. 9B shows the enumeration algorithm recommended for the case shown in FIG. 9A.

All of the cases of FIG. 8A are processed similarly to FIG. 7B, with the exception of Cases 4 and—10. Case 4 is illustrated in FIG. 9A. With this orientation, columns may be intersected twice by the same curved boundary of the footprint. These cases therefore require a distinct enumeration procedure illustrated in FIG. 9B, which is specifically for Case 4. It is possible to handle this case as two cases, depending on the ordering of $x_3$ and $x_4$. Five footprint sections can then be processed in the manner described above, with the exception of the rightmost section. This section can be enumerated by bounding using the right and left trapezoidal boundaries to enumerate candidate points. Each candidate point is tested for enclosure within the circle of the top trapezoidal boundary.

Because points enclosed within the top and bottom sections of Cases 4 and 10 are relatively few in number, an alternative method of enumeration is more efficient for these cases. It is illustrated in FIG. 9B. Three sections are considered in the alternative method. In Case 4 the left section is bounded on the left by the minimum of $x_3$ and $x_4$, and on the right by the maximum x value on the bottom circle, namely $$x_v = x_s + \rho + u$$

For a column within this region, each receiver point between the right and left trapezoidal boundaries is tested for enclosure by the bottom circle. Only those outside the circle are within the footprint.

Similarly in Case 4, the right section of the alternative method is bounded on the left by the minimum of $x_1$ and $x_2$, and on the right by the maximum x value of the top circle, namely $$x_u = x_s + \rho + u$$

For a column within this region, each receiver point between the right and left trapezoidal boundaries is tested for enclosure by the top circle. Only those inside the circle are within the footprint. In Case 10 the processing is the same, except that minimum circle values are the left boundaries, and maximum coordinate values are the right boundaries. In the left section receiver points inside the top circle are in the footprint, and in the right section, it is receiver points outside of the bottom circle. Given the division into sections just described, the middle section is treated in Cases 4 and 10 as in the other 10 cases.

Figure 10:
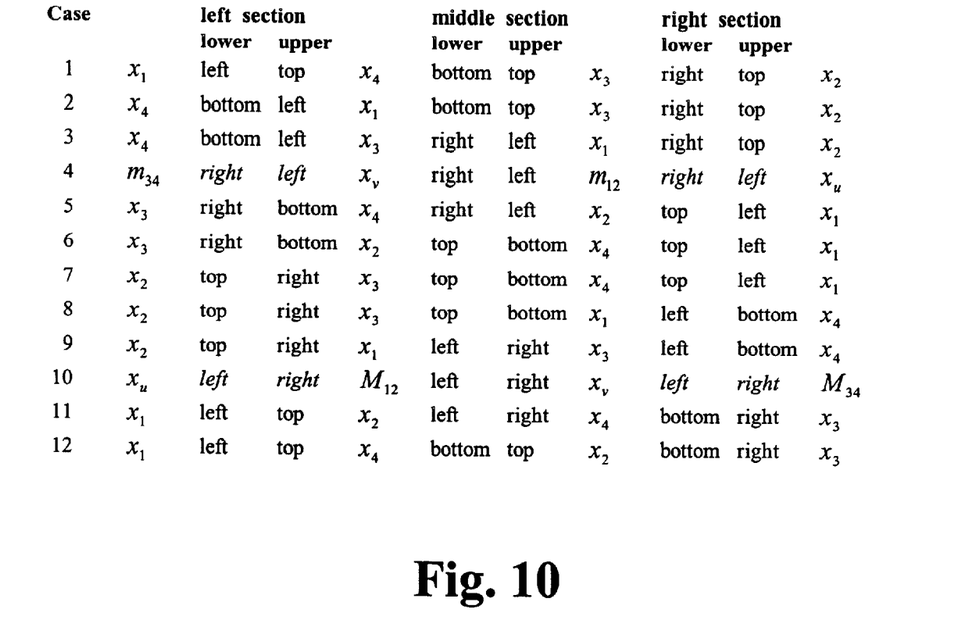
FIG. 10 is a table summarizing the footprint section boundaries for the 12 orientation cases.

A table summarizing the section dividing coordinates, and the column boundaries for the 12 cases of footprint orientation is presented in FIG. 10. Enumeration algorithms for Cases 1, 2, 5–9, 11 and 12 are derived from the algorithm of FIG. 8 by substituting dividing coordinates and boundary equations from this table in the obvious manner. In the Case 4 and Case 10 entries of this table, minimum values are denoted by lower case italic m, and maximum values by large case italic M. Italicized boundary names in these entries denotes testing of values for inclusion within footprint boundary circles.

Figure 11:
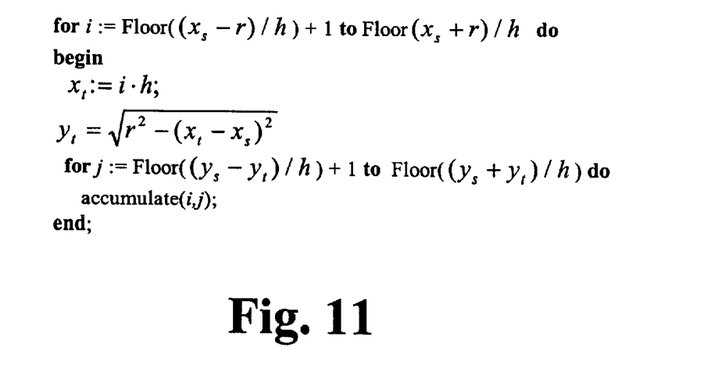
FIG. 11 shows an enumeration algorithm for circular cones covering the poles of the cone grid.

As was mentioned earlier, particular systems may require cones of circular cross section, approximately equal in cross sectional area to other cones. The center rays of these cones will be aligned vertically, so that the footprints of these cones will be circular in shape. A simplified enumeration algorithm is employed for these cones, illustrated in FIG. 11 with Pascal conventions. In this algorithm one circular section is processed, with its radius r determined by the distance of the source from the receiver grid. The outer loop of the algorithm enumerates the vertical grid lines intersecting the circular footprint, and the lowest and highest receiver test points on that line are determined as bounds on the inner loop enumerating receiver test points.

Based upon the foregoing description and use of the modeling system presented above, the advantages thereof are readily apparent. First, the system provides a method for accurately determining signal coverage of an indoor wireless communication system. The system employs a unique way of determining the intersection of transmitted signals with receivers such that there is virtually no overlap of coverage. This allows for cost effective placement of transmitters and receivers within a building structure or even in a complex of buildings.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of true scope and breadth of the invention, reference should be made to the following claims.

What is claimed is:

1. A computerized method for determining the signal coverage provided by a wireless communication system of at least one point source, such as a transmitter, and at least one receiver in a building that is based upon a model, comprising the steps of:

physically designating locations of the at least one point source and the at least one receiver in the model of the building;

covering completely and without overlap, the space around a point source by a plurality of cones of about equal size;

assigning relative signal strength to each of said plurality of cones based on the angular orientation of a transmitter at said point source and a spherical antenna pattern associated with the transmitter;

processing in a forward direction from said point source to the receiver a center ray segment of each said plurality of cones corresponding to transmitted and reflected portions of said center ray segments in uninterrupted travel between modeled building surfaces;

providing receiver test points arranged in regularly spaced, rectangular, planar receiver grids on the modeled building surfaces;

computing the intersection of said cones with said receiver test point grids;

enumerating the receiver test points within said cone intersections for the accumulation of electromagnetic effect of said ray segment on said receiver test point;

adjusting the physically designated locations at the at least one point source and the at least one point source and the at least one receiver in the model of the building, as is needed, to ensure adequate signal coverage; and placing transmitters and receivers within the building based upon the model.

2. The modeling method of claim 1, further comprising the step of defining a spherical grid fixed with poles vertically aligned, said spherical grid being defined by latitude bands divided into equally sized spherical patches by segments of longitudes, wherein said spherical grid defines said plurality of cones.

3. The modeling method of claim 1, further comprising the step of generating said center ray segments in a forward direction from said point source to the receiver by a function that generates said center ray segments in a loop and said reflected portions of said center ray segments by recursively calling itself, wherein said loop and said recursive calls terminate when distance from said point source and accumulated signal losses from transmissions through and reflections by modeled building structures determine that said receiver points cannot be significantly affected by said center ray segment.

4. The modeling method of claim 1, further comprising the step of generating said center ray segments in a forward direction from said point source to the receiver by a function that generates said reflected portions of said center ray segments in a loop and transmitted center ray segments by recursively calling itself, wherein said loop and said recursive calls terminate when distance from said point source and accumulated signal losses from transmissions through and reflections by modeled building structures determine that said receiver points cannot be significantly affected by said center ray segment.

5. The modeling method of claim 1, further comprising the step of employing dimensions of said receiver grids to determine if said receiver grid contains receiver test points significantly affected by said center ray segment.

6. The modeling method of claim 1, further comprising the step of computing the intersection of each said cone containing said intersecting ray segment with said receiver test grid, enumerating the receiver test points enclosed by the intersection for accumulation of electromagnetic effect of said ray segment on said enclosed receiver test points.

7. The modeling method of claim 1, further comprising the step of accumulating the electromagnetic affects on receiver test points separately and maintained the affects separately for each of said source points.

8. The modeling method of claim 1, further comprising the step of:
displaying the accumulation of electromagnetic effect to optimize signal coverage by re-positioning said at least one point source or by adjusting its relative power or by adding one or more point sources to the model.

9. A computer-readable medium having computer-executable instructions for performing a method of determining signal coverage of a wireless communication system within a building, the method comprising:

receiving input of transmissive and reflective properties of at least walls, floors and openings of the building;

receiving input of antenna patterns associated with at least one type of transmitter;

generating a model of the building features including at least walls, floors and openings, and associating their transmissive and reflective properties with the building features;

assigning at least one transmitter and at least one receiver to positions on the model;

covering the space around said at least one transmitter with a plurality of cones of approximately equal size;

assigning a center ray segment with a relative signal strength of the antenna pattern to each of said plurality of cones and associating a receiver grid pattern with said at least one receiver;

processing said center ray segment generated by said transmitter through each of said plurality of cones toward said receiver including a determination of transmission and/or reflection of said center ray segment upon impinging the building features, said processing step tracking said center ray segment until strength thereof is deemed negligible; and computing an intersection of said plurality of cones with said receiver grid pattern to determine if said relative signal strength is adequate to reach said at least one receiver.

10. The computer-readable medium according to claim 9, further comprising:
for defining said plurality of cones with a spherical grid defined by a plurality of substantially equally sized latitude bands divided into substantially equally sized segments of longitude.

11. The computer-readable medium according to claim 9, further comprising:
displaying an accumulation of said center ray segments on said receiver grid pattern to determine whether placement of said at least one transmitter is adequate.

12. The computer-readable medium according to claim 9, further comprising:
adjusting positions of said at least one transmitter and said at least one receiver in the model of the building and repeating said covering, assigning, processing and computing steps, as needed, to ensure adequate signal coverage; and
physically placing actual transmitters and receivers within the building represented by the model.

* * * * *

UNITED STATES PATENT AND TRADEMARK OFFICE
CERTIFICATE OF CORRECTION

PATENT NO. : 6,446,031 B1
APPLICATION NO. : 09/235865
DATED : September 3, 2002
INVENTOR(S) : John T. Welch It is certified that error appears in the above-identified patent and that said Letters Patent is hereby corrected as shown below:

Title Page item 54 and Col. 1
Please change the title from:

CONE MAPPING PHYSICAL OPTICS FOR DESIGN OF INDOOR COMMUNICATION SYSTEM to:

CONE MAPPING PHYSICAL OPTICS FOR DESIGN OF INDOOR COMMUNICATION SYSTEMS

Signed and Sealed this

Thirtieth Day of December, 2008

JON W. DUDAS
*Director of the United States Patent and Trademark Office*